Sept. 5, 1967     E. B. COX     3,340,446
ELECTRICAL CAPACITOR

Filed May 24, 1966     2 Sheets-Sheet 1

Inventor,
Eugene B. Cox,
by Sidney Greenberg
His Attorney.

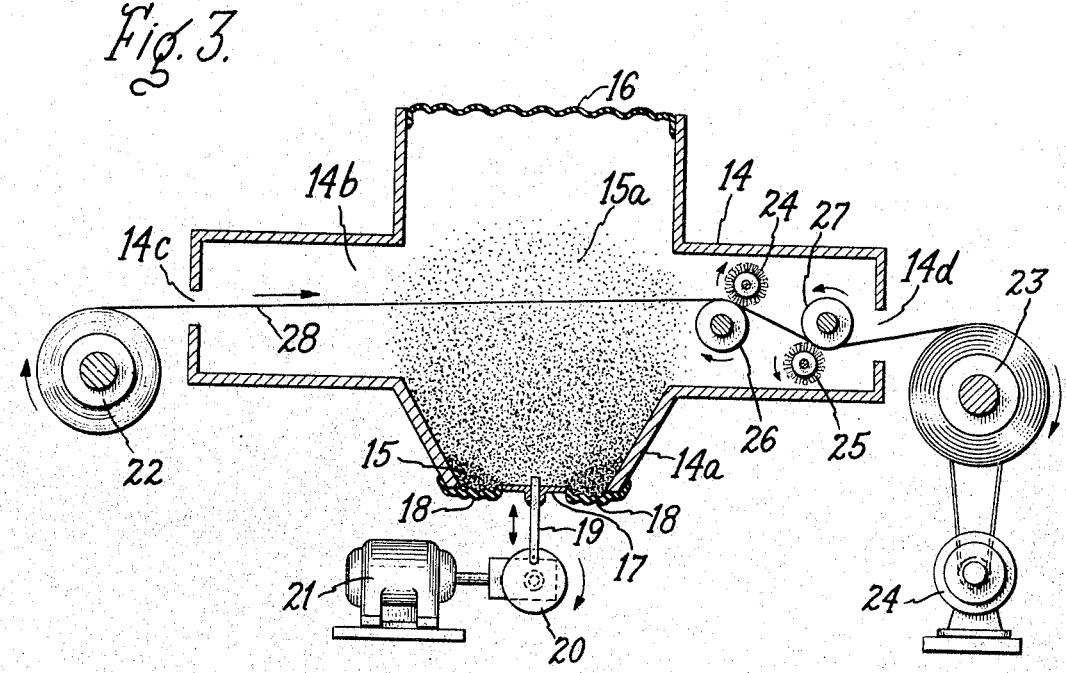

United States Patent Office 3,340,446
Patented Sept. 5, 1967

3,340,446
ELECTRICAL CAPACITOR
Eugene B. Cox, South Glens Falls, N.Y., assignor to General Electric Company, a corporation of New York
Filed May 24, 1966, Ser. No. 559,030
4 Claims. (Cl. 317—258)

This application is a continuation-in-part of my previous application, Ser. No. 311,121, now abandoned, filed Sept. 24, 1963, which is assigned to the same assignee as the present invention.

The present invention relates to electrical capacitors, and more particularly relates to a novel construction and process for modifying synthetic resin films for use as dielectric spacers in electrical capacitors.

Capacitor dielectric spacers have conventionally been made of kraft paper or other cellulosic material, but in recent years synthetic resin films have come into increasing use as capacitor spacer material, either alone or in conjunction with kraft paper sheets. Synthetic resin films in general are superior to cellulosic dielectrics in that they can withstand higher voltage stresses per unit of thickness, are less subject to flaws and defects, such as pin holes or conducting particles which reduce electrical strength, and have better power factor characteristics. In view of these and other properties, capacitors with plastic film dielectrics can usually be made smaller than paper dielectric capacitors to obtain equivalent capacitance and voltage ratings. However, thin plastic films are subject to the drawback that they tend to stick and to adhere tightly to one another and to the electrode foils with which they are wound in the manufacture of capacitors. This phenomenon is commonly referred to as "blocking." The resultant sticking of the synthetic resin film surfaces to adjacent surfaces of synthetic resin film or metal foil makes it difficult to uniformly wind capacitor rolls of such material. Of even greater significance, however, is that such sticking tendencies cause the finally rolled capacitor unit to have air voids therein and prevent ready flow of dielectric liquid to all portions of the roll. As a result, the electrical strength of the insulating system is markedly reduced and the capacitor units are subject to premature breakdown and shortened operational life. This is especially true for alternating voltage applications where the air voids are sites of electrical discharges, specifically corona discharges, which decompose the dielectric and generate detrimental gases in the capacitor.

In addition, capacitors utilizing synthetic resin film dielectric spacers in combination with dielectric fluid impregnants have not come into general usage because the non-porous nature of these films renders it extremely difficult to adequately impregnate them and further, in some instances, because a relatively high dissipation factor seems to be unavoidable. The latter problem causes high energy losses, a particularly severe problem which has thermal side effects often leading to premature capacitor failure. The impregnability of synthetic resin films, in the absence of a porous material to act as a wick on the surface of these films, results in unoccupied pores and voids in the interstices occurring between the films and adjacent non-porous surfaces. The effect of these unoccupied pores and voids, i.e., corona discharges occurring therein and resultant deterioration of the dielectric, is similar to that described above with respect to the air voids caused by the sticking tendencies of synthetic resin films when assembled in rolled capacitors.

Still another object of this invention is to facilitate the assembly of rolled electrical capacitors using synthetic resin film dielectric spacers.

One other object of this invention is to provide electrical capacitors with synthetic resin film dielectrics having a reduced dissipation factor and extended useful life.

It is also an object of this invention to provide electrical capacitors, having synthetic resin film dielectrics, capable of withstanding relatively high voltages without suffering dielectric breakdown or corona discharges.

These and other objects are met, in accordance with the present invention, by the provision of an electrical capacitor comprising a pair of electrodes separated by a synthetic resin film, which includes, either on its surface or throughout its mass, a particulate inorganic dielectric material. It is preferred, for this purpose, to use aluminum oxide having a particle size of about .1 to .3 micron in diameter. This material may be either dusted on the film after it has been formed, and held there by static electricity, or by incorporating the aluminum oxide particles into the resinous mass prior to the formation of the film.

The subject matter of the present invention is particularly pointed out and distinctly claimed in the concluding portion of this specification. My invention, however, together with the further objects and advantages thereof, may be better understood by reference to the following description, taken in conjunction with the accompanying drawings in which:

FIGURE 3 is a view of an apparatus which may be employed in practicing the present invention.

Figure 1:
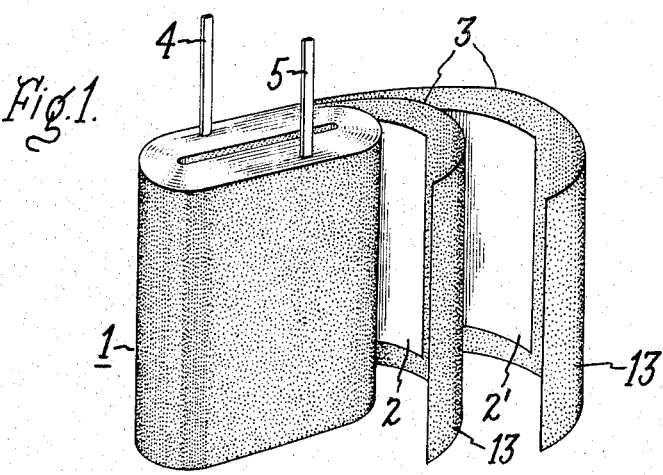
FIGURE 1 is a perspective view of a wound capacitor section, shown partially unrolled, which may embody the present invention.

Looking first to FIGURE 1, there is shown a rolled capacitor section 1 made up of wound alternate layers of metal foils 2, 2' and dielectric sheets 3 constituted by thin synthetic resin films. The metal foils 2, 2' serve as the capacitor electrodes and may be composed of aluminum, copper, tantalum, lead, tin, or any other known or suitable type of capacitor electrode material. Electrical contact with electrodes 2, 2' is made up by tap straps 4, 5 of electrically conducting material which are applied to the electrodes and project from the end of the wound capacitor section. Although not specifically illustrated, a porous spacer material, such as a sheet of kraft paper, may be placed between electrode foils 2, 2' in addition to the synthetic resin films 3. This construction is often desirable and sometimes necessary in the case of tightly wound, high voltage A-C capacitors.

In accordance with the present invention, synthetic resin films 3, in FIGURE 1, are modified by the use of a particulate inorganic dielectric material 13 which is either homogeneously dispersed throughout the mass of the synthetic resin film or on the individual surfaces thereof.

Although the synthetic resin films 3 used in the present invention may comprise any one of a great number of polymeric and copolymeric materials, polypropylene may be of particular interest because of its favorable mechanical and dielectrical properties.

Figure 2:
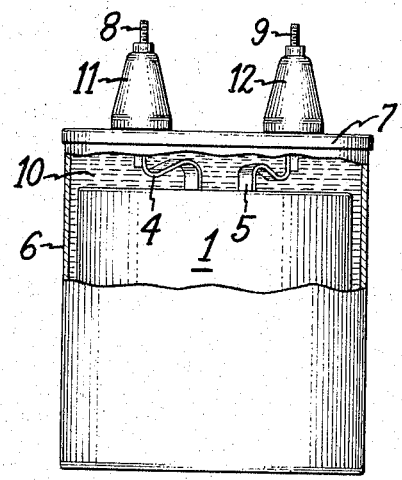
FIGURE 2 is an elevational view of the FIGURE 1 capacitor section assembled in a casing, shown partly broken away.

FIGURE 2 shows the wound capacitor section 1, of FIGURE 1, enclosed in a casing 6 provided with a cover 7 and containing a dielectric liquid 10 substantially filling the casing 6 and impregnating the wound capacitor section. On cover 7, which seals the interior of casing 6, are arranged bushing insulators 11 and 12 on which are mounted terminals 8 and 9 respectively connected to tap straps 4 and 5.

Dielectric liquid 10 may be composed of any suitable capacitor impregnating material, as for example halogenated aromatic compounds, mineral oil, polybutene, silicone oil, caster oil, and the like. Hardenable dielectric liquids may also be employed, whereby the dielectric is introduced in liquid form into the capacitor section and then hardened in situ by suitable curing or other methods.

Capacitors of known construction other than that shown could be used, as, for example, those having exposed electrode foils in which tap straps may be dispensed with. Also, the invention may be employed in stack type or other forms of capacitors, instead of the roll type shown.

Looking now to FIGURE 3, there is shown an apparatus which may be employed to apply the particulate inorganic material to the surfaces of a synthetic resin film. As shown, the device comprises a housing 14 having a depression 14a containing a supply of particulate inorganic material 15 and a chamber 14b having an entrance 14c and an exit 14d. Chamber 14b is closed at its top by a thin rubber sheet 16 and the opening at the bottom of depressed portion 14a is closed by a metal plate 17 and a heavy rubber sheet 18 sealing the latter to the housing. Plate 17 is eccentrically connected by arm 19 to wheel 20 which is rotatable about its axis by motor 21, so that as wheel 20 rotates, plate 17 is driven in a reciprocating, up-and-down motion. Supply reel 22 is arranged at entrance end 14c of the apparatus, and take-up reel 23 and driving means 24 therefor are located at the exit end 14d. Within housing 14 near the exit end there are arranged rotary brushes 24 and 25 on opposite sides of the path the plastic film passing through the apparatus, and rubber guide rollers 26 and 27 are arranged in contacting relation to brushes 24 and 25, respectively. In the operation of the described apparatus, a dust cloud 15a is generated in housing chamber 14b as a result of reciprocation of plate 17, and plastic film 28 is passed through the dust 15a as it is fed from supply reel 22 to take-up reel 23, so that the dust particles cover all surfaces of the film. The dust cloud density is controlled by the speed at which plate 17 is driven. Rubber sheet 16 serves as an air cushion and avoids driving of the particulate inorganic material, in particular the very fine particles thereof, out of the entrance and exit ends, during movement of plate 17. After passage through dust cloud 15a, plastic film 28 moves between brush-roller pairs 24, 26 and 25, 27 in sequence for sweeping of excess dust therefrom and is then rewound on take-up reel 23. In a typical process, aluminum oxide powder used for the dusting operation is pre-dried at about 350° C. for about 16 hours to remove moisture therefrom.

In making impregnated, convolutely wound capacitors, synthetic resin films dusted in the described manner are then wound, in one or more sheets, in combination with sheets of porous material if desired, between foil electrodes. This wound capacitance unit is then assembled in a container having an impregnation fill hole, and impregnated with the desired dielectric liquid in accordance with known techniques.

As an alternative to the dusting operation, the particulate inorganic material may be combined with the synthetic resin material prior to the time that the film is formed. The thus modified synthetic resin material may then be extruded or otherwise formed into a film by other conventional methods. Similarly, the synthetic resin film modified in accordance with this embodiment of the present invention, may then be wound, alone or in combination with other synthetic resin films or sheets or porous material, between foil electrodes. The wound capacitor section may then be inserted into the case and impregnated.

Referring to the form of the invention in which particulate inorganic material is dusted on the surface of a synthetic resin film, the particulate material should be applied in a single thickness uniformly and homogeneously distributed over the surface of the plastic film, so as to obtain the least separation between the plastic dielectric film and the electrode foil. Thus maximum capacitance is attained while still providing for access of dielectric liquid to the entire interface occupied by the layer of particles and for permeation and occupation of the voids in the latter by the impregnant. The finely divided particles should also be selected for compatibility with the particular plastic film and dielectric liquid employed, and in order to reduce the field enhancement around the particles, the powdered material should have a product of dielectric constant and resistivity as nearly equal to the liquid impregnant as possible. The size of the particles should be small compared to the thickness of the capacitor dielectric films and should be relatively free of sharp edges to avoid physical damage to the film. For practical reasons the maximum particle diameter is about 1.0 micron.

With regard to the compatibility and particle size of the particulate inorganic material used, the same requirements apply to that form of the invention in which this material is dispersed throughout the mass of the synthetic resin film.

Considerable difficulty is avoided in winding film capacitors by means of the present invention. Ordinarily great care must be taken to avoid wrinkles and gaps caused by the sticking and blocking tendencies of synthetic resin films. Since these defects create spaces which act as sites for localized corona discharge, their occurrence must be minimized. When a film includes particulate inorganic material, either on its surface or dispersed throughout its mass, blocking properties of the film are improved, i.e., its propensity for sticking to smooth surfaces is reduced. This makes it much easier to wind capacitors free of these defects. Indeed, it is this property which is one of the significant advantages in capacitors produced in accordance with the present advantage.

In a series of tests conducted in connection with the invention, a group of capacitors was made each comprising a wound pair of aluminum electrode foils separated by .35 mil thick Mylar (a polyethylene terephthalate film commercially available from Du Pont) dielectric film dusted with powdered aluminum oxide having a particle size of about .1 micron, and a control group of capacitors was made of identical construction except that the Mylar film was not dusted with the powdered aluminum oxide. Both groups were impregnated under the same conditions with polybutene dielectric liquid (Oronite No. 16). It was found that whereas the average corona starting voltage for the undusted control group of capacitors was 500 volts A-C, the capacitors with the dusted Mylar film had an average corona starting voltage of 600 volts A-C.

In another test, capacitors wound with polycarbonate dielectric film .4 mil thick dusted with .1 micron aluminum oxide particles and impregnated with polybutene liquid exhibited a corona starting voltage of 700 volts A-C or higher. These tests are indicative that the inclusion of the particulate inorganic material improves the impregnability of synthetic resin dielectric films as evidenced by these relatively high corona starting voltages.

In life tests conducted on a number of liquid-impregnated capacitors having different synthetic resin dielectric films, both dusted and undusted, it was found that in all cases the life of the capacitor with dusted film was considerably longer than those with undusted films. For example, in a group of six capacitors having undusted Mylar plastic films impregnated with polybutene dielectric liquids, all capacitors failed before 852 hours under test conditions of 380 volts, 60 cycles, at 85° C. In contrast, in a group of seven identical capacitors, differing only in that Mylar film was dusted with aluminum oxide particles in accordance with the present invention, none failed even up to 3,545 hours under the same test conditions, and five capacitors of this construction did not fail after 350 hours at 500 volts A-C.

Further samples impregnated with polybutene and having aluminum oxide dusted on dielectric films of polycarbonate and polypropylene showed similar ability to withstand voltages up to 500 volts A-C for considerable periods without failure.

The improvements in corona start voltage and capacitor life observed in capacitors having particulate inorganic material dusted on the surface of synthetic resin film dielectric spacers, demonstrates the surprising and beneficial results produced by the use of the particulate inorganic dielectric material. These beneficial results are in addition to the improved "blocking" properties of such films which, as pointed out above, facilitate the assembly of convolutely wound capacitors with a minimum amount of voids, pores, and other spaces, caused by the sticking or "blocking" of the synthetic resin film to adjacent surfaces in the process of the winding operation.

The extended capacitor life, noted above with regard to electrical capacitors having particulate inorganic material dusted on the surfaces of synthetic resin film dielectrics, may be related to the scavenging or absorbing effect which these inorganic dielectric particles exhibit toward contaminants or stray polar compounds such as those produced by voltage-induced degradation of dielectric materials. The effective removal of such contaminants reduces energy loss in the system and may be observed, for example, as a reduction in dissipation factor. The reduced energy loss in the system results in a reduction in the amount of internal heat generated during operation which in turn prolongs capacitor life. Ordinarily, internal heat generated in the system is detrimental to the structural materials, and particularly to synthetic resin films which may deteriorate under the influence of heat.

The effect of aluminum oxide particles in reducing the dissipation factor of synthetic resin films, apparently by reacting with contaminants in the films, is quite noticeable in impregnated polypropylene capacitors.

As an example of the improvement in dissipation factor produced by the use of particulate inorganic material in the mass of synthetic resin films used as capacitor dielectric spacers, films were formed by placing one gram of powdered polypropylene, specifically a resin commercially available from Hercules under the designation Hercules 6520, between flamed 3.5 mil aluminum foils. Two 3.5 mil strips of aluminum foil were also placed between the foils but at the edges to act as spacers during the pressing operation. The assembly was placed in a Carver hydraulic press having heated platens and held at 200° C. for one minute preheat before applying 20,000 pounds of pressure for one minute. The foils and sample were removed and rapidly quenched in a large volume of deionized water. The resulting film was 3.5 to 4.5 mil thick and approximately 16 square inches. A similar procedure was followed to produce test samples in which .1 micron aluminum oxide was added to the resin, in the amount of 1%, prior to pressing the resin into film.

A number of three inch diameter samples of these films were placed between pairs of aluminum foil electrodes, vacuum dried at 85° C. at 100 microns pressure for one hour and impregnated with Pyranol 1499, a dielectric liquid, commercially available from the General Electric Company, comprised primarily of trichlorodiphenyl. The samples were then measured for capacitance and dissipation factor at 3 voltages at 85° C. and 100° C. The recorded values of dissipation factors at 60 Hz. are shown below:

TABLE I.—PERCENT DISSIPATION FACTOR VS. VOLTAGE VS. TEMPERATURE

| Temp. | Voltage Measurement | Sample A, Plain PP | Sample B, Plain PP | Sample C, PP/1% $Al_2O_3$ | Sample D, PP/1% $Al_2O_3$ |
|---|---|---|---|---|---|
| 85° C | 100 | 2.991 | 1.473 | .546 | .344 |
|  | 300 | 2.784 | 1.300 | .417 | .299 |
|  | 500 | 2.316 | 1.034 | .330 | .269 |
| 100° C | 100 | 3.526 | 2.322 | .897 | .596 |
|  | 300 | 3.320 | 2.149 | .635 | .518 |
|  | 500 | 2.838 | 1.748 | .490 | .458 |

These data clearly indicate the value of aluminum oxide in reducing the dissipation factor of Pyranol-impregnated polypropylene film capacitors.

In the system used in the above test, the liquid impregnant probably plays some part in the dissipation factor reduction by acting as a diffusion agent for bringing the contaminants and the inorganic particles into contact. In the absence of an impregnant, diffusion of either the inorganic materials or the contaminants into contact with one another would be unlikely. It will be appreciated therefore that in unimpregnated capacitors, the dispersion of the particulate inorganic material throughout the mass of the synthetic resin film would be advantageous since the contaminants are likely to be dispersed throughout the mass of the synthetic resin film also.

While this invention has been described only with regard to the use of aluminum oxide as the particulate inorganic material and to particular synthetic resins as the dielectric films, it will be appreciated that numerous variations and substitutions in the present invention may be made by those skilled in the art without departing from the true spirit and scope of the invention. Therefore, the appended claims are intended to cover all such equivalent variations and modifications as come within the true spirit and scope of the invention.

What I claim as new and desire to secure by Letters Patent of the United States is:

1. An electrical capacitor comprising, in combination, metal electrode foils separated by dielectric spacer material, said dielectric spacer material comprising synthetic resin film material having smooth surfaces, a layer of finely-divided particles of aluminum oxide disposed essentially on only said surfaces of said synthetic resin film material and contacting the surface of the adjacent metal electrode, said particles being less than about .5 micron in diameter, and a dielectric liquid material impregnating said layer of finely-divided particles and filling the voids therein.

2. The invention as recited in claim 1 wherein said film is polypropylene.

3. The invention as recited in claim 2 wherein said liquid impregnant is trichlorodiphenyl.

4. An electrical capacitor consisting essentially of:
 (a) a casing,
 (b) a convolute roll of a pair of electrode foils and an intermediate resin film dielectric therebetween in intimate contact with said electrodes and positioned in said casing,
 (c) said dielectric resin including at least one film of less than about 0.001 inch thickness and being taken from the class consisting essentially of polycarbonate and polypropylene resins,
 (d) said film having combined therewith aluminum oxide particles of less than about 0.5 micron average diameter in contact with said electrode foils,
 (e) and trichlorodiphenyl liquid impregnating said roll in contact with said aluminum oxide.

References Cited

UNITED STATES PATENTS

| | | | |
|---|---|---|---|
| 2,424,853 | 7/1947 | Safford | 317—258 X |
| 2,446,928 | 8/1948 | Hodgdon | 317—258 X |
| 2,995,688 | 8/1961 | Rosenberg | 317—258 |
| 3,048,750 | 8/1962 | Netherwood | 317—258 |
| 3,090,705 | 5/1963 | Miksits. | |

FOREIGN PATENTS

| | | |
|---|---|---|
| 623,731 | 7/1951 | Canada. |
| 970,037 | 9/1964 | Great Britain. |

LARAMIE E. ASKIN, *Primary Examiner.*

E. GOLDBERG, *Assistant Examiner.*